United States Patent [19]

Durham

[11] Patent Number: 4,526,558
[45] Date of Patent: Jul. 2, 1985

[54] CHAIN ENGAGEMENT SLOT FOR BICYCLE SPROCKETS

[76] Inventor: Roger O. Durham, 1370 Thompson St., Glendale, Calif. 91201

[21] Appl. No.: 546,163

[22] Filed: Nov. 3, 1983

[51] Int. Cl.³ .............................................. F16H 55/30
[52] U.S. Cl. ...................................... 474/152; 74/437
[58] Field of Search ........................ 474/152, 155–158; 74/432, 437; 29/159.2

[56] References Cited

U.S. PATENT DOCUMENTS

| | | | |
|---|---|---|---|
| D. 35,192 | 10/1901 | Dodge | 474/152 |
| 740,445 | 10/1903 | Langerfeld | 474/152 |
| 1,181,175 | 5/1916 | Shapiro | 474/152 |
| 3,709,053 | 1/1973 | Ohshita | 474/156 |

FOREIGN PATENT DOCUMENTS 154443  9/1938  Fed. Rep. of Germany ...... 474/152

*Primary Examiner*—Stephen J. Novosad
*Assistant Examiner*—Bruce M. Kisliuk

[57] ABSTRACT

A chain engagement slot for bicycle sprockets, which enables a bicycle chain to be shifted from a smaller sprocket to a larger sprocket mounted next to it on a common cluster body. The chain partly enters the chain engagement slot, causing sufficient contact between the chain and the next sprocket tooth to enable the chain to be seated on the larger sprocket.

4 Claims, 1 Drawing Figure

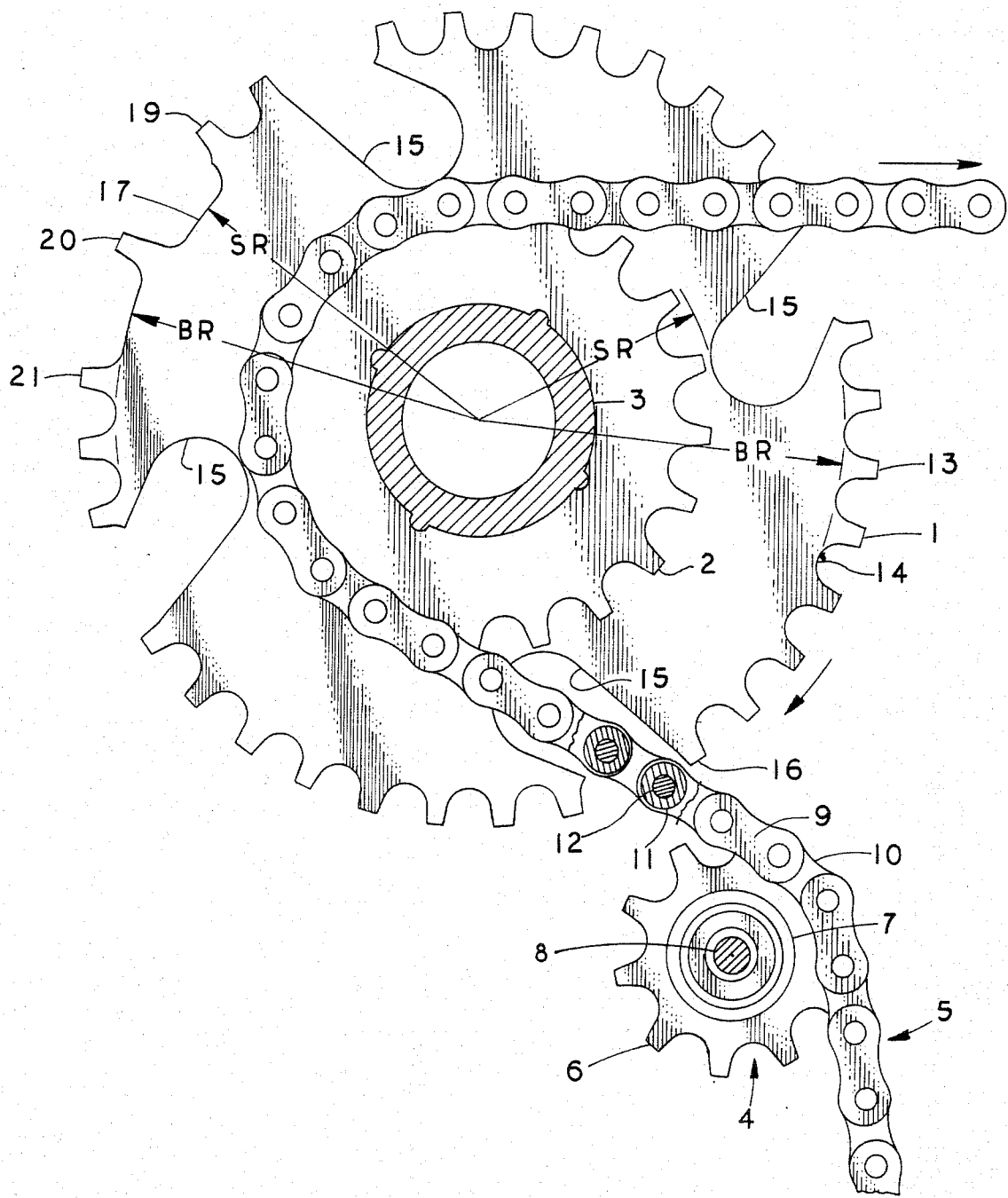

CHAIN ENGAGEMENT SLOT FOR BICYCLE SPROCKETS

BACKGROUND OF THE INVENTION

This invention pertains to bicycle sprockets, in which several sprockets are coaxially mounted spaced apart from each other, and in which a laterally-flexible drive chain means is guided onto one sprocket and caused to shift to another sprocket by laterally shifting a guide sprocket or guide means. Such sprockets have from 12 to about 40 teeth. Shifting the chain from a larger sprocket to a larger sprocket is easily accomplished when the sprockets are nearly the same size, but it becomes more difficult when there is a large difference in sprocket sizes. For example, it is easy to cause a chain to shift from a 14 tooth sprocket to a 16 tooth sprocket, but difficult to cause it to change from a 24 tooth sprocket to a sprocket with 36 teeth; sometimes, under such circumstances, it is difficult to induce the chain to shift at all. What happens is that the chain can't get sufficient engagement on any tooth, and simply rattles from one tooth to the next without changing.

In the past, in order to provide better shifting of the chain, sprockets have been produced in a 'skip-tooth' pattern, wherein a tooth is provided for every other chain roller. Sometimes, too, alternate tips of the sprocket teeth are bent in opposite directions to make shifting easier; for the same purpose, sprocket teeth often have sharp, rather than rounded, corners, to make it easier for the sprocket to get a 'bite' on the chain and make the desired shift.

Such measures help, but there is still room for improvement.

In order to provide wide ratios in gearing, without employing clusters having large size differences between adjacent sprockets, bicycle manufacturers often supply two or three front sprockets and an adjustable front chain guide, along with a rear cluster having modest size differences in adjacent sprockets. This provides wide overall gear differences without the objectionable large differences in adjacent rear sprocket sizes.

If the chain could be caused to easily make changes between sprockets having large differences in size, the additional front sprockets and the front chain guide mechanism could be often eliminated, with a saving in complexity, weight, and expense.

So, there is need for any device which makes shifting easier between sprockets having large differences in size, and that is what this invention provides.

SUMMARY OF THE INVENTION

In the current invention, a chain engagement slot is formed in a sprocket, to a depth below that of the roller seats. The chain is guided partially into the slot by a guide sprocket, and the next tooth on the sprocket makes significant engagement with the chain, causing the chain to shift with ease up onto the much larger sprocket.

BRIEF DESCRIPTION OF THE DRAWING

In the drawing, a roller chain is shown running over a small, laterally adjustable sprocket and over the smaller of two sprockets mounted on a cluster body. The larger of the two sprockets has five chain engagement slots according to the invention, including one shallow chain engagement slot. The chain is shown occupying one of the slots, as it would appear just before it engaged a tooth of the larger sprocket and shifted onto it, provided the guide sprocket were aligned with the larger sprocket.

DETAILED DESCRIPTION OF THE DRAWING

A large sprocket 1 and a small sprocket 2 are coaxially mounted spaced apart from each other on a common cluster body 3. A guide means 4 is shown to be of the guide sprocket type, which engages a laterally-flexible roller chain means 5. Said guide means 4 is laterally positioned by a derailleur mechanism which is not shown. Said guide means 4 is alignable with said large sprocket 1 or with said small sprocket 2. If said guide means 4 is aligned with said small sprocket 2, the chain means 5 will be led onto said sprocket 2; if the guide means 4 is then aligned with said large sprocket 1, the chain will hopefully hop obeciently from said small sprocket 2 onto said large sprocket 1.

Said guide means 4 comprises a guide sprocket 6, a bearing means 7, and a fixed spindle 8.

Said roller chain means 5 includes a number of outer link plates 9, a number of inner link plates 10, a number of roller bushings 11, and a number of pins 12. Said pins 12 are pressed into said outer link plates 9, and are a slip fit in said inner link plates 10. Said roller bushings 11 turn freely on said pins 12.

Said large sprocket 1 has a number of sprocket teeth 13. Between said sprocket teeth 13 are arcuate roller seats 14 adapted for seating portions of said rollers 11 of said roller chain means 5. Said sprocket teeth 13 extend between said chain inner link plates 10, and are adapted for retaining said chain 5 on said sprocket 1. Said roller seats 14 are tangent to a bottom radius BR which is shown to originate at the common center of said sprocket 1, said sprocket 2, and said cluster body 3.

Said small sprocket 2 is similarly constructed up to this point.

Said large sprocket 1 has a chain engagement slot 15, which is formed by the removal of a complete sprocket tooth. Four of such chain engagement slots are shown. Said chain engagement slot 15 extends to a lesser radius SR than said bottom radius BR. Said lesser radius SR is shown to also originate at the common center of said sprocket 1, said sprocket 2, and said cluster body 3. A tooth 16 is shown adjacent said chain engagement slot 15. said chain means 5 is shown as it would appear just before it came in contact with said tooth 16, provided said guide sprocket 6 were aligned with said large sprocket 1.

The formation of a 'skip-tooth' sprocket tooth, wherein alternate sprocket teeth are removed, is shown between a tooth 20 and a tooth 21. The skip tooth is formed extends only to the bottom radius BR as shown.

The formation of a shallow chain engagement slot according to the invention is shown between a tooth 19 and said tooth 20. A shallow chain engagement slot 17 is shown to extend to a lesser radius SR than said bottom radius BR.

MODE OF OPERATION

Both sprockets rotate in a clockwise manner.

When the chain is running normally on the small sprocket 2, said guide sprocket 6 is positioned in alignment with said small sprocket 2.

When it is desired to change the chain means 5 from the small sprocket 2 to the large sprocket 1, said guide sprocket 6 is shifted into alignment with said large sprocket 1. With such a difference in sprocket sizes, it is most likely the chain would not make the shaft until the engagement slot 15 came past the chain, at which time the chain would partly enter said engagement slot 15, sufficiently for part of said chain 5 to be aligned with the teeth of said sprocket 1, causing said tooth 16 to contact said roller chain link plates 9 or 10 (or possibly said roller bushing 11 as well) and to subsequently cause the roller chain means 5 to seat itself on said large sprocket 1.

While a deep chain engagement slot, such as said slot 15, is more effective in causing a chain to shift, even a shallow chain engagement slot, such as said chain engagement slot 17, will be a help; even the skip-tooth pattern shown between said teeth 20 and 21 is of some benefit in causing the chain to shift. Skip-tooth sprockets are in common use.

Where the chain is shown to be guided onto one or the other of the sprockets by a laterally-adjustable guide sprocket, other guide meas, such as guide cages, which contact the sides of the chain, are well known and are in common use.

I claim:

1. In a bicycle having a drive chain and at least two spaced-apart, coaxially mounted sprockets, said sprockets having teeth with arcuate roller seats, said roller seats being tangent to a bottom radius originating at the center of said sprockets, said bicycle also having a laterally-adjustable guide means adaptable for guiding said drive chain onto one or the other of said sprockets, said guide means also adapted for causing said drive chain to shift from one of sid sprockets to the other, a chain engagement slot formed in at least one of said sprockets, said chain engagement slot extending to a lesser radius than the bottom radius of said bicycle sprocket, said chain engagement slot adapted for receiving said drive chain and allowing said drive chain to be aligned with said teeth of said sprocket, whereby said drive chain is caused to engage a tooth of said sprocket and to seat itself on said sprocket.

2. Apparatus according to claim 1, wherein said guide means is a guide sprocket adaptable for engagement with said drive chain.

3. In a bicycle sprocket adapted for coaxial mounting mounting with similar sprockets, wherein a drive chain is guided from one sprocket to another by a guide means, said sprocket having teeth with roller seats which are tangent to a bottom radius originating at the center of said sprocket, a chain engagement slot extending to a lesser radius than the bottom radius of said bicycle sprocket, whereby said drive chain may be partially guided into said chain engagement slot for contact with a sprocket tooth, whereby said drive chain is caused to seat itself on said sprocket.

4. In a bicycle having a drive chain, at least two spaced-apart sprockets which are coaxilly mounted on a cluster body, said sprockets having teeth with arcuate roller seats which are tangent to a bottom radius, said bottom radius originating at the center of said sprockets and said cluster body, and wherein a laterally-adjustable guide means guides said drive chain onto one or the other of said sprockets and causes the chain to shift from one sprocket to the other, a chain engagement slot formed in a larger of said sprockets, said chain engagement slot extending to a lesser radius than the bottom radius of said larger sprocket.

* * * * *